United States Patent [19]

Spencer

[11] 4,283,973

[45] Aug. 18, 1981

[54] METHOD AND APPARATUS FOR HANDLING ARTICLES

[75] Inventor: Harvey J. Spencer, Green Bay, Wis.

[73] Assignee: Paper Converting Machine Company, Green Bay, Wis.

[21] Appl. No.: 94,491

[22] Filed: Nov. 15, 1979

[51] Int. Cl.³ .................. B65G 47/90; B26D 1/56; B26D 7/06; B65G 17/48
[52] U.S. Cl. .......................................... 83/23; 83/151; 83/323; 83/325; 198/377; 198/479; 198/694
[58] Field of Search .................. 83/318, 323, 325, 23, 83/151; 198/377, 457, 459, 461, 478, 479, 482, 653, 694–696

[56] References Cited

U.S. PATENT DOCUMENTS

| | | | |
|---|---|---|---|
| 3,288,266 | 11/1966 | Bradley | 198/412 X |
| 3,868,009 | 2/1975 | Billi et al. | 198/461 |
| 4,033,862 | 7/1977 | Spencer | 198/696 X |
| 4,041,813 | 8/1977 | Spencer | 83/327 X |
| 4,059,187 | 11/1977 | Rueff et al. | 198/461 |
| 4,066,162 | 1/1978 | Miaskoff | 198/377 |

Primary Examiner—Jeffrey V. Nase
Attorney, Agent, or Firm—Tilton, Fallon, Lungmus & Chestnut

[57] ABSTRACT

A method and apparatus for handling articles (such as web stacks) wherein a series of articles is advanced along a first lineal path and gripped therein, thereafter directed about an arcuate quadrant to a second path perpendicular to the first path and while still being gripped, and thereafter translated, while still being gripped, into a third path parallel to the second path, the handling in the first, second, and third paths occurring while a dimension of the article remains parallel to the direction of travel of the first path.

13 Claims, 9 Drawing Figures

METHOD AND APPARATUS FOR HANDLING ARTICLES

BACKGROUND AND SUMMARY OF INVENTION

This invention relates to a method and apparatus for controlled handling of articles and, more particularly, to handling under high speed controlled conditions where the articles are rotated 90° so as to present a different attitude for subsequent processing, and is illustrated within the environment of handling web stacks.

This invention is an improvement on co-owned U.S. Pat. No. 3,288,266 which was directed to a transfer device (cartoner loader) utilizing paddles to sweep stacks of web units such as interfolded tissue, C-folded towels, etc., about an arc so as to change stack direction and modifying the attitude or orientation relative to the center line of stack travel. A present machine operating according to the teachings of the '266 patent is limited to a range of 250-275 stacks or "clips" per minute. Above these speeds, windage becomes a problem, particularly on C-folded products where the "wings" can fold outward because of the windage and cause jam-ups in either the transfer device (carton loader), the cartoner bucket infeed conveyor, or in the cartoner itself.

The basic problem has been one where the stack or clip is not "entrapped" throughout the entire transfer cycle and the reason for the absence of positive entrapment is the difficult and previously unsolved requirement for changing direction of stack travel without changing its attitude with respect to a point in space, the requirement being necessary for proper presentation to a cartoning machine or other processing means.

Essentially, state of the art transfer speeds at 250-275 are the normal processing line limitation. Certain cartoning machines go up to 300 clips per minute but even if one were to use two cartoners in tandem for a potential 600 clips per minute, present state of the art transferring units simply cannot handle clips of these speeds because of the severity of action, the lack of product entrapment, and windage factors.

According to the present invention, the speed limitation has been overcome through a combination of conveyors utilizing gripping means which function throughout the entire transfer cycle. More particularly, web stacks are advanced along a first lineal path while being gripped by first gripping means and thereafter the first gripping means turned 90° while the stacks are directed through an arcuate quadrant into a second lineal path perpendicular to the first path, the stacks remaining in the same attitude by virtue of the dual turning of the gripping means, and thereafter the stacks being gripped by second gripping means in the second path and translated into a third path for cartoning.

Other objects, advantages and details of the invention may be seen in the ensuing detailed description.

DETAILED DESCRIPTION

The invention is described in conjunction with the accompanying drawing in which FIG. 1 is a plan view of apparatus for practicing the instant invention;

Figure 1:
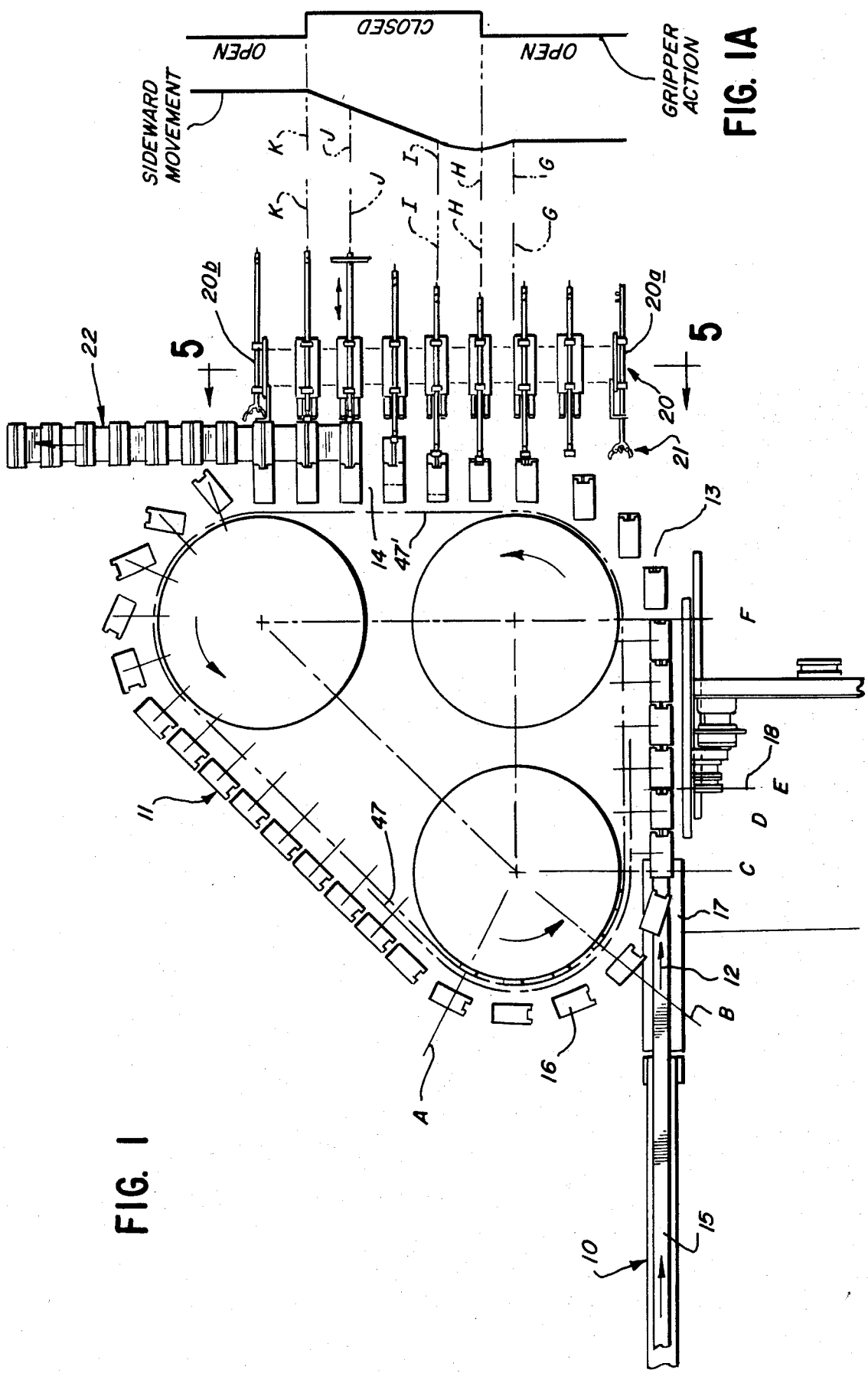
FIG. 1A is a graph showing certain motions of the second gripping means and arranged in alignment with the second gripping means in FIG. 1.

In the illustration given and with reference first to FIG. 1, the numeral 10 applied at the lower left hand portion indicates generally the frame of the machine. The frame is mostly omitted so as to show the operational parts more clearly.

Mounted on the frame 10 is a first endless conveyor 11 which is seen, in the illustration given, to have an essentially triangular, closed path of travel. As such, it proceeds along a first lineal path 12 (see the central bottom of FIG. 1), around an arcuate quadrant 13 (a 90° turn) and into a second lineal path 14 which is perpendicular to the first path 12. For the embodiment illustrated, the remainder of the path of travel of the conveyor 11 is not significant.

Figure 4:
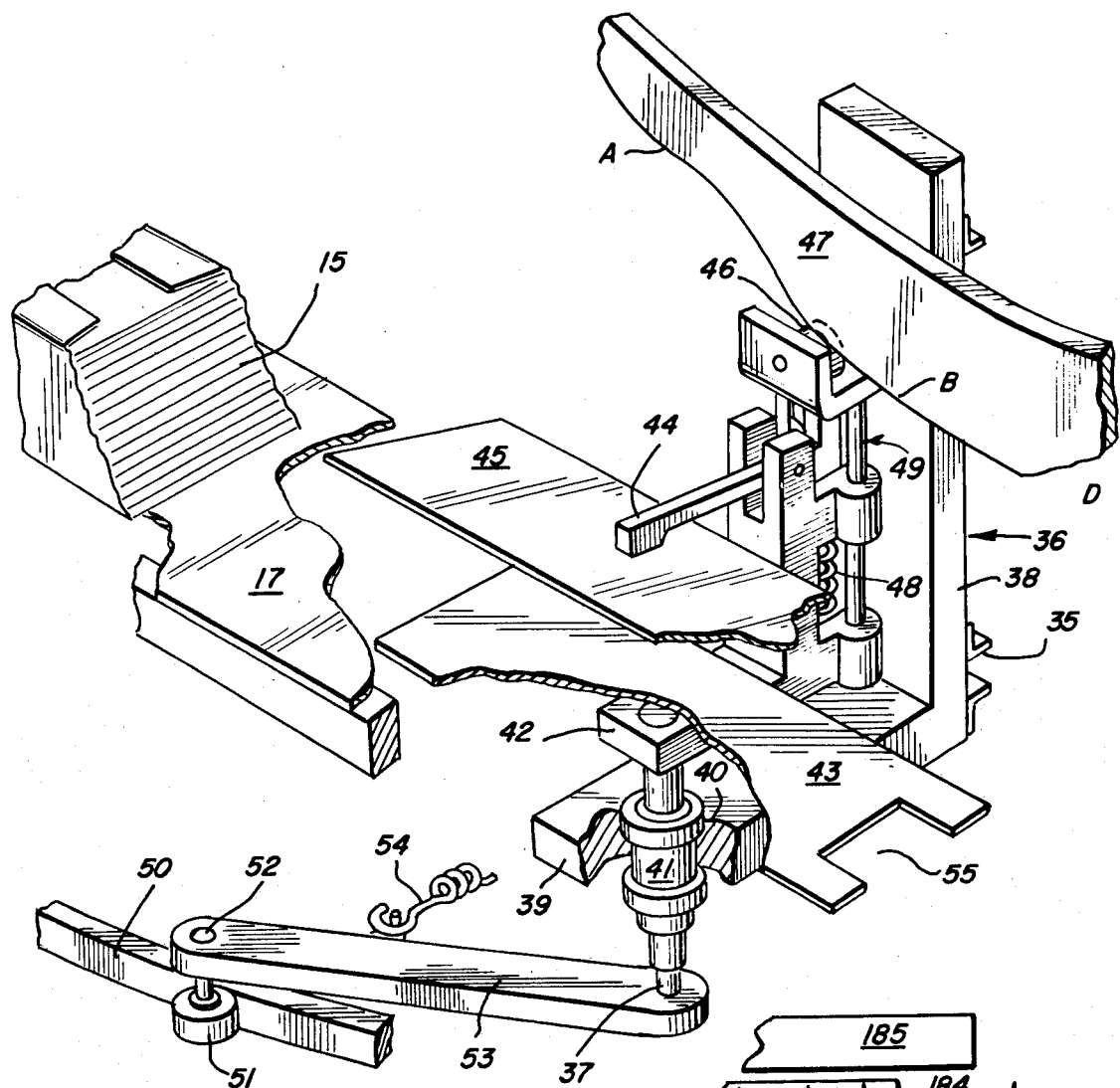
FIG. 4 is a fragmentary perspective view of the apparatus seen in FIG. 2 but in enlarged scale.

The conveyor 11 is adapted to handle superposed webs such as the C-folded webs 15 illustrated in fragmentary form in FIG. 4. A wide variety of different types of superposed web plies may be advantageously handled through the practice of the invention.

More particularly, the superposed webs 15 (see particularly FIG. 2) encounter a first gripping means which consists of longitudinally spaced apart grippers generally designated 16.

Referring again to FIG. 1, the grippers which have vertically spaced apart clamping plates pass over and under the continuous webs 15 as the latter are supported on a plate 17. The grippers 16 grip the continuous web plies at spaced apart areas and a continuous motion saw 18 (of the character seen in U.S. Pat. No. 4,041,813) enters between the grippers 16 and while traveling with the conveyor 11, transversely severs the webs into stacks 19 (see both FIGS. 1 and 2).

As indicated previously, the stacks are directed around a 90° arc 13 but maintain their original attitude, i.e., the long dimension (as shown) remains parallel to the first lineal path 12—this even after the stacks are in the second lineal path 14.

As the stacks travel in the second lineal path 14, they encounter the grippers 21 of a second conveyor generally designated 20 (see also FIGS. 5-7) and are removed from the second lineal path 14 into a third lineal path where they are received by a bucket conveyor 22 for delivery into a cartoner.

FIRST CONVEYOR

Figure 2:
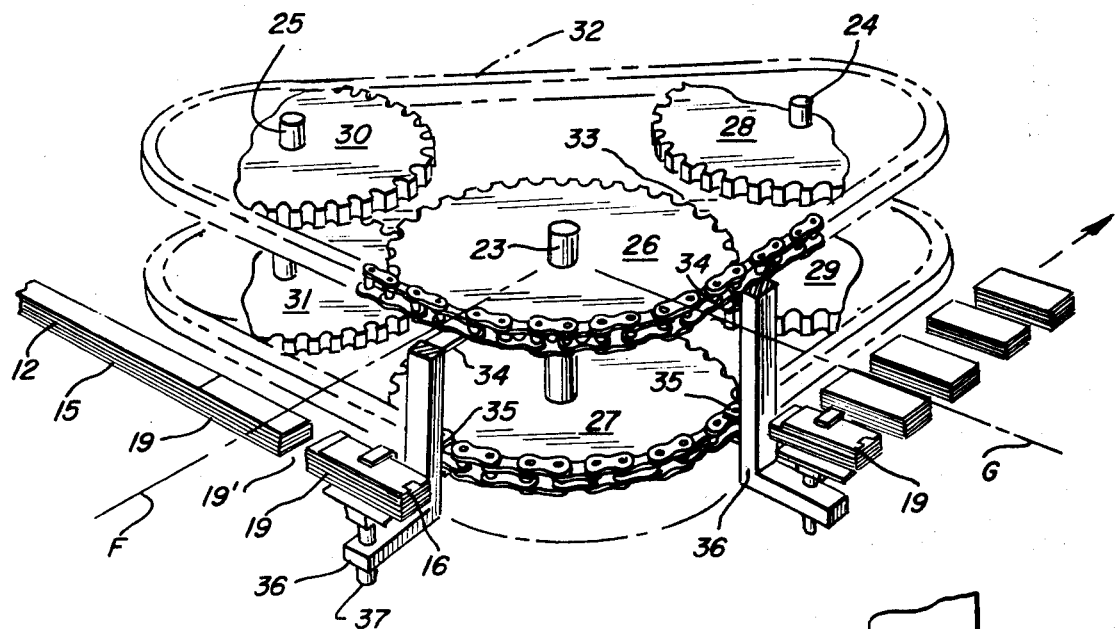
FIG. 2 is a fragmentary perspective view of a portion of the apparatus of FIG. 1.

The first conveyor 11, in the operational details, can be first appreciated from a consideration of FIG. 2 wherein three vertically extending shafts 23, 24 and 25 are suitably journalled in the frame 10 (not shown). Vertically spaced apart sprockets 26, 27 are provided on shaft 26 while sprockets 28, 29 are fixed to the shaft 24 and sprockets 30, 31 are fixed to the shaft 25. The sprocket sets 26-28-30 and 27-29-31 define two paths of chain travel, i.e., for the upper chain 32 and the lower chain 33. Each of the chains supports a pair of brackets 34 (relative to the chain 32) and 35, (relative to the chain 33) each pair of brackets 34 and 35 carries an L-shaped arm 36—two of which can be seen in FIG. 2. Thus, as the sprockets 26-31 rotate, the entrained chains 32 and 33 travel therewith and conduct the L-shaped arms around an endless generally triangular shaped path. Carried on each L-shaped arm 36 is a post 37 suitably journalled therein.

Referring now to FIG. 4 wherein a single L-shaped arm generally designated 36 is seen in perspective view, it will be seen that the arm 36 includes an upstanding portion 38 and a horizontal portion 39 equipped with an opening 40 in which a bearing 41 is fixed therein. The shaft 37 is rotatably mounted within the bearing 41.

The shaft 37 at its upper end carries a gripper support 42 which is also L-shaped and which fixedly supports a lower plate 43. Pivotally mounted on the upper portion of the gripper support 42 is a pivot arm 44 to which is affixed the upper plate 45. Also carried by the gripper support 42 is a cam follower 46 which is adapted to engage the lower contour of a cam 47.

Referring again to FIG. 1. the position designated A indicates a time in the cycle where the plate 45 is in closed or in gripping position—in the upper central portion of FIG. 4, the contour of the cam at position A is seen to be relatively elevated so that the spring 48 pivots the arm 44 downwardly and with it the plate 45 into gripping or clamping relation to a stack (not shown).

As the conveyor 11 operates, the gripper 16 ultimately comes to the position B (compare FIGS. 1 and 4). At that position, the cam 47 is sloped downwardly so that the cam follower 46 follows the cam contour and overcomes the urging of the spring 48 and pivots the plate 45 upwardly, i.e., the gripper 16 of FIG. 2 is now in "open" condition. Meanwhile, the plate 43 passes under the plate 17 so as to be in supporting relation to the endless webs 15.

Continuing the description of operation, the cam follower 46 ultimately gets to the position indicated C wherein the cam contour slopes upwardly and permits the spring 48 to urge the follower 46 upwardly to close the upper plate 45. Closing is completed at the position D. All of this is effected through the provision of a slidable assembly generally designated 49 which moves vertically relative to the gripper support 42 under the urging of the spring 48 as may be opposed by the cam follower 46 operating against the cam 47.

Referring to FIG. 1, the position designated E depicts the point of entry of a continuous motion saw 18 and which travels with the conveyor to develop the stacks 19. As the stacks reach the position designated F (still referring to FIG. 1), they enter into an arcuate quadrant turn which is completed at position G. During this change in direction of the L-shaped arms 36 (see FIG. 2), the stacks 19 are maintained in the same attitude relative to the first lineal path 12, by using a pivotable secondary arm 42 which also changes direction but does not change orientation under the influence of attitude cam 50 (see the lower portion of FIG. 4).

As a prerequisite to the coacting relationship of L-shaped arms 36 and secondary arms 42, it is noted that the article clamping-turning means shown generally as 36-37-42 in FIG. 2 (and detailed in FIG. 4) is mounted outside the pitch line (chain run) of associated sprockets 26-27, etc., and as the clamping-turning means begins arcuate travel as at F, gaps 19' (see FIGS. 1 and 2) are created; the gaps between stacks permitting subsequent pivotable motion without interference between stacks.

In order to maintain clamped control of the article to change its direction without changing its orientation parallel to first path 12, a cam follower 51 of FIG. 4 is mounted adjacent the cam 50 on a shaft 52 which in turn is carried by a generally horizontally extending arm 53. Fixed at the other end of arm 53 from that carrying the cam follower 51 is the vertical post 37 which is, as previously pointed out, carried by the bearing 41 on the L-shaped arm 36. A spring 54 connects the arm 53 with the L-shaped arm 36.

Figure 3:
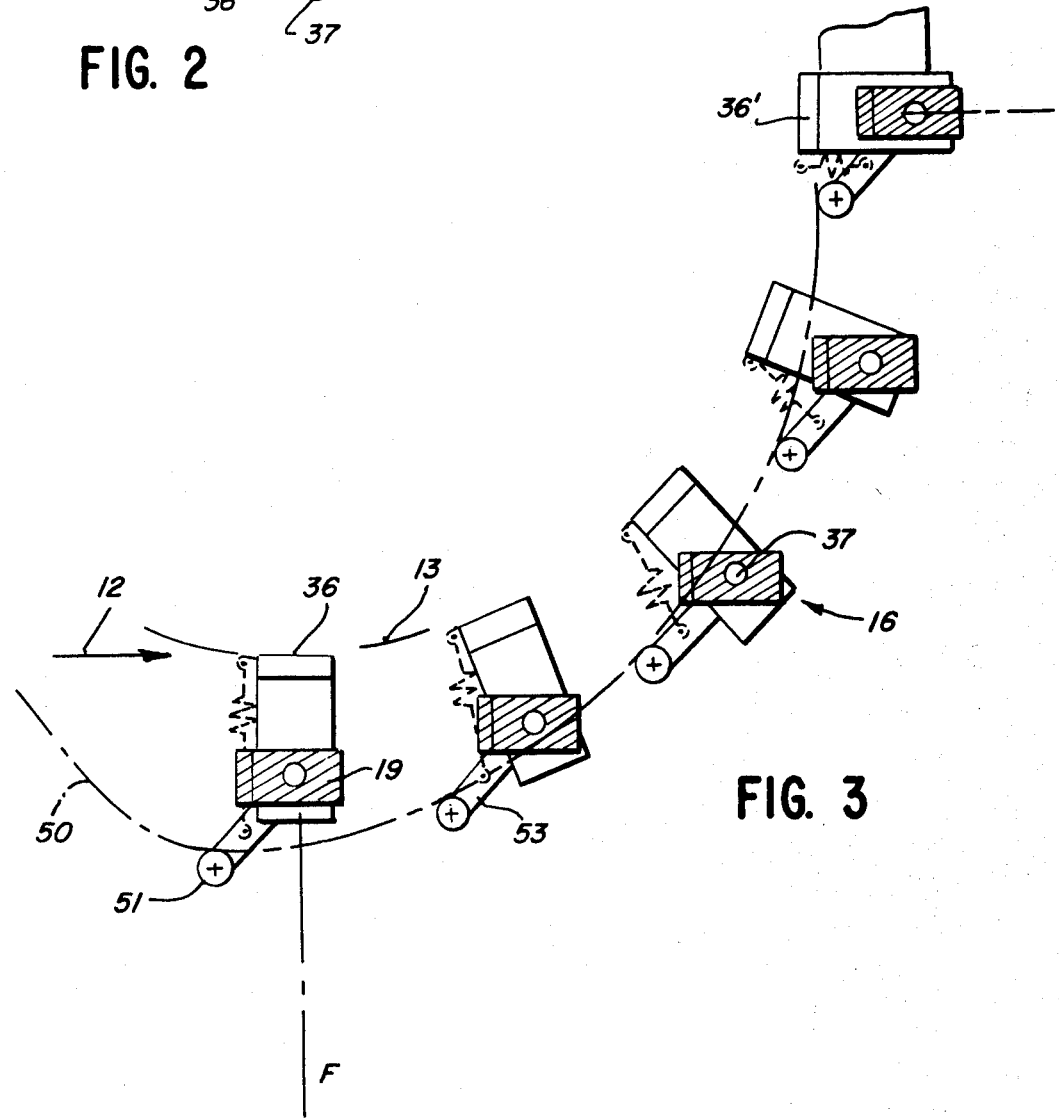
FIG. 3 is a plan schematic view of the apparatus of FIG. 1.

The movement about the arcuate quadrant 13 can be appreciated from a consideration of FIG. 3. In the lower left hand portion at the position designated F, the stack 19 is seen to be disposed with a certain dimension (here the long dimension) parallel to the first path 12. Then, notwithstanding the fact that the L-shaped arm 36 proceeds around the arc and turns 90° (compare 36 with the position designated 36') the stack 19 maintains its original attitude by virtue of the control afforded by the attitude cam 50. Meanwhile, there is no interference from the closing cam 47 inasmuch as this terminates at the position D (see FIG. 1). It should also be appreciated that before continuous webs are cut into stacks by saw 18 at position E, the superposed webs have been gripped or clamped so as to be firmly under control and not subject to distortion due to windage.

SECOND CONVEYOR

As the stacks reach the position G (see FIG. 1), they are in position for translation from the second path 14 into the third path defined by the bucket conveyor 22. For this purpose, the second conveyor generally designated 20 is employed and which can be seen also in schematic form in FIG. 5. FIG. 1 only shows the lower run of the conveyor 20 so as to more clearly depict the operation of this phase of the invention.

The second conveyor 20 carries a plurality of longitudinally spaced apart grippers 21—the lowermost gripper in FIG. 1 being seen as it passes down around the end sprocket of the conveyor and thus presents a view of the gripping jaws different from the remainder of the grippers 21 seen in FIG. 1.

To enable the grippers 21 of the second conveyor 20 to take over the control of the stacks 19 at the position G, the plates 43 and 45 are notched or recessed as at 55 (see FIG. 4). To permit this takeover, another section of closing/opening cam is provided as at 47' (see the right hand central portion of FIG. 1). Thus, at the position designated H in FIG. 1, the grippers 21 have closed and taken over control of the stack and the grippers 16 of the first conveyor 11 are in the process of being opened so as to yield this control.

As the conveyors 11 and 20 reach the position designated I in FIG. 1, the grippers 16 of the conveyor 11 are open, i.e., the plate 45 has been pivoted upwardly by virtue of the cam 47', and the gripper 21 of the second conveyor 20 has started to retract so as to move the stack 19 from the second path to the third lineal path defined by the bucket conveyor 22.

Before going into the specific means for achieving the secondary gripping and translation, reference is made to FIG. 1A. There, is seen a pair of graphs, the left hand one of which is designated sideward movement. This relates to the translation of the grippers 21 as they move in a direction from 20a to 20b where it is seen that between the positions designated I and J, there is movement to the right so as to position stacks in the third path—of the bucket conveyor 22. Thereafter, the grippers on the conveyor 20 return once more (via the top path) to the beginning of the second path, as at 20a of FIGS. 1 and 5.

The right hand graph in FIG. 1A is labeled gripper action and designates the position or condition of the grippers 21 at various positions along the second and third lineal paths. At position H, for example, the grippers are seen to close and maintain that condition until position J is reached whereupon they open to place the now translated stacks under the control of the bucket conveyor 22. After the grippers 21 open under the influence of cam means, the grippers continue to move away from the article so as to clear the article and the conveyor 22 as each gripper moves around a sprocket to commence its upper return run (see FIG. 5).

Figure 5:
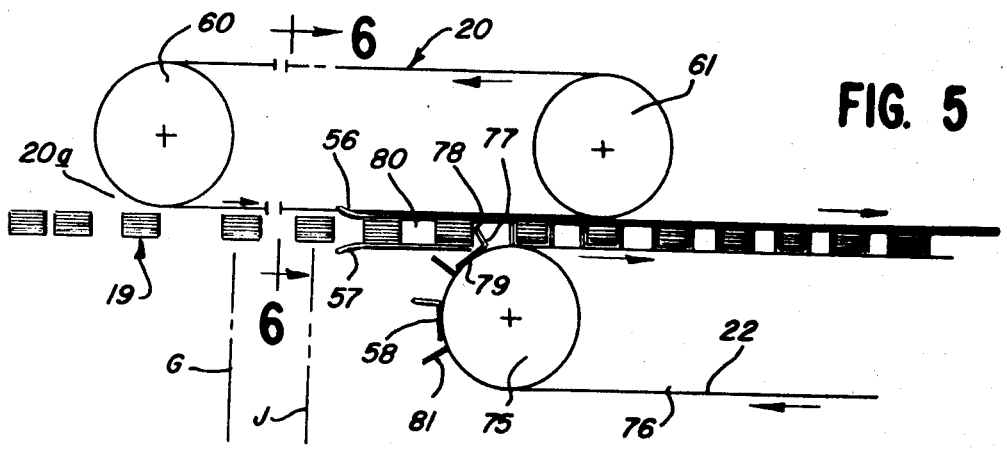
FIG. 5 is a sectional view taken along the sight line 5—5 applied to FIG. 3.

To get the stacks into position for cartoning while the same are continuously controlled, i.e., gripped or clamped, the third path defined by the bucket conveyor 22 is equipped with rails 56 and 57 (see FIG. 5 in the central portion thereof). More particulary, the frame carries a pair of upper guide rails and a pair of lower guide rails providing a central opening through which the buckets 58 may pass. By this time the second grippers 21 have retracted—to reach the position J—so that the stacks 19 are aligned with the bucket conveyor 22. The gripper conveyor 20 includes pairs of head and tail sprockets 60 and 61 (see also FIG. 6). About the sprockets are entrained chains equipped with clips 62 and which carry transversely extending blocks 63—which in turn carry the grippers 21.

Figure 6:
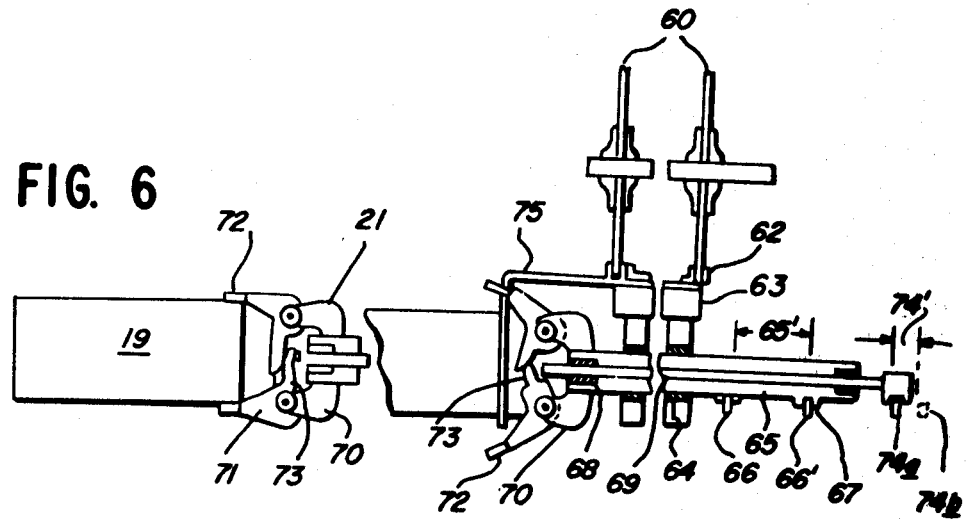
FIG. 6 is an enlarged sectional view taken along the sight line 6—6 applied to FIG. 5.

FIG. 6 represents a sectional elevation and shows the grippers in the open condition in the right hand portion (and the closed position in the left hand portion thereof). This same explanation applies to FIG. 7 which is a plan view of the showing in FIG. 6. Referring again to FIG. 6, the numeral 64 refers to a pair of bushings carried by each block 63 and which in turn carry a hollow shaft 65 slidable therein. Here it will be appreciated that two motions are employed—a translating motion of the grippers and the opening/closing motion thereof. The hollow shaft 65 provides the translatory motion by virtue of cam rail motion from 66 to 66' or vice versa by operation between and urging operation against cam follower slot 67. The amount of translation is indicated by the dimension designated 65' in FIG. 6.

Opening/closing of the gripper 21 is achieved through the rod 69 slidable within bushing 68 within the hollow shaft 65. Each gripper includes a pair of arms 70 mounted on the hollow shaft 65 and which carry pivotal jaw parts 71 having affixed to their ends pads as at 72. The numeral 73 represents a projection on the jaw parts 72 which is engaged by the inner rod 69 to open the pad 72, i.e., to the condition illustrated in the right hand portion of FIG. 6. When the inner rod 69 is retracted, the jaw parts 71 close under the influence of a spring (not shown).

Figure 7:
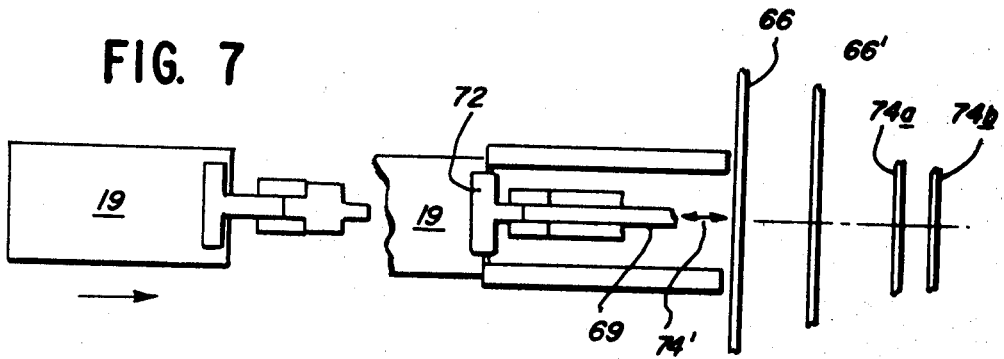
FIG. 7 is a plan view of the second gripping means seen in FIG. 6.

Actuation for the inner rod 69 is provided by a cam schematically represented at 74a-b which moves the rod over a dimension designated 74' at the right hand portion of FIG. 6 and also in FIG. 7.

The bucket conveyor 22 of FIG. 5 which receives the articles (herein illustratd as web stacks) include a pair of head sprockets 75 which cooperate with a pair of tail sprockets (not shown). About these sprockets are entrained a pair of chains 76—still referring to FIG. 5. Cross bars extend between the chain 76 to support the longitudinally spaced apart buckets 58.

It is to be noted that the leading vertical edge 77 of the bucket 58 travels radially around the sprocket 75 and thus the uppermost tip 78 has a greater velocity than the bucket "floor" 79. This beneficial arrangement allows the tip 78 to enter the gap 80 between the stacks at a speed which has a horizontal vector equal to the horizontal speed of the stack. When the front lip 77 is vertical, the tip 78 and all other parts of the bucket 58 travel at a velocity equal to the chain 76, that velocity being lower than the radial speed of the tip 78. The net effect is that the front lip 77 and trailing fingers 81 coact to entrap the web stacks to maintain positive placement and control.

From the foregoing, it will be noted that all articles or stacks which start out in substantially butting relationship (after transverse cutting as illustrated) are advanced along the first lineal path 12. Thereafter they are in effect "translated" to change the direction of movement 90° around the quadrant 13 ino the second lineal path 14 but while maintaining the attitude (longer dimension extending in the same direction) the same as in the first path 12. By mounting the clamping means of the conveyor 11 outside of the pitch line of the sprockets 26, 27, special velocity considerations come into play and, in effect, open up "gaps" (as at 19') that allow rotation of each stack without interference in the first path 12, and allow the stack to be moved into the new lineal path 14. This same advantageous arrangement is employed in conjunction with the movement of the stacks into the buckets which permit the stacks to be moved into a bucket gap which later closes to surround the package—see the central lower portion of FIG. 5.

Figure 8:
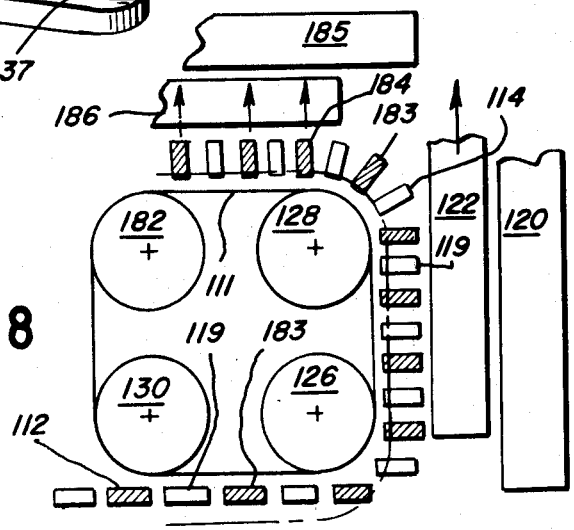
FIG. 8 is a schematic plan view of another version of apparatus for practicing the invention.

Reference is now made to FIG. 8 which shows an arrangement whereby the addition of a fourth pair of sprockets as at 182 permits the use of two cartoning machines. The conveyor 111 thus is entrained around the sprockets 126, 128, 182 and 130—the elements common to the showing in the earlier described embodiment being the same except for the addition of 100. What is depicted in FIG. 8 is an input of articles along the path 112 which is twice the capacity of the first gripper conveyor 120, i.e., only the articles 119 (unhatched) are delivered to the first bucket conveyor 122. Alternate articles as at 183 (hatched) proceed around the sprocket 128 into a fourth lineal path 184 and are transferred by means of a gripper conveyor 185 into a fifth lineal path 186, corresponding to a bucket conveyor similar to that illustrated at 22 and 122.

Thus, the bucket conveyors 122 and 186 are arranged to accept the total output of product 119 and 183 traveling in the direction 112. The alternate product 119 proceeds in the direction 30 and, without turning the product, the direction of travel changes to be parallel with the first bucket conveyor 122 moving in direction 114. While traveling at uniform and equal speeds in the direction 114, the product 119 is moved into the path of bucket conveyor 122.

Downstream and turning around the sprocket 128, the alternate (not removed) stacks 183 are turned 90° and also change direction 90° so that they travel parallel with the bucket infeed conveyor 186, moving in direction 184. In this position, the alternate stacks 183 are moved in a direction perpendicular to the path 184 by grippers mounted on the gripper conveyor 185. The mechanism which keeps the stacks oriented in the same direction around sprocket 126 is deactivated when traveling around the sprocket 128 to achieve the stack orientation illustrated in FIG. 8.

In this embodiment, the gripper plates 43 and 45 are not completely opened or the gripping force completely relaxed as in the previous embodiment but merely sufficient to permit the grippers associated with the gripper conveyor 120 to extract alternate stacks or articles from the first conveyor 111. For this purpose, alternate gripper mechanisms (as at 21 in the previous illustration) are removed so that the gripper conveyor 120 only pulls alternate articles or stacks into the buckets of the third path 122. Thus, alternating stacks or articles which are unaffected by the gripper conveyor 120 (because of the absence of the removed grippers) are rotated around a quadrant which changes both the direction and orientation of the article as it enters the fourth path 184—but here the direction of orientation is at 90° from the orientation in the first path 112. The alternating stacks 183 are then translated from the fourth path 184 into the fifth lineal path defined by the second bucket conveyor 186. This displacement from the fourth to the fifth path is accomplished by alternating grippers of the second gripper conveyor 185 which duplicates the first gripper conveyor 120 except that the retained grippers are 180° out of phase.

From the foregoing, it will be seen that web stacks can be handled for cartoning by advancing the same through several paths all while under positive control, i.e., gripping or clamping until the same are deposited in a bucket conveyor where the problem of windage no longer exists. It is within the scope of the invention to apply the beneficial motions and orientations described herein to other article handling means.

I claim:

1. A method of handling stacks of web units comprising advancing a series of stacks along a first lineal path while the same are gripped by first gripping means also advancing in said first path, turning said first gripping means 90° while directing said first gripping means through an arcuate quadrant and into a second lineal path normal to said first path advancing said first gripping means in said second path, actuating second gripping means also being advanced in said second path to grip stacks therein and thereafter sequentially deactuating said first gripping means and laterally translating second gripping means with said stacks to a third lineal path parallel to said second path whereby said stacks are presented for subsequent processing in spaced apart relationship with a dimension of said stack remaining parallel with the center line of said first path as it is advanced through said first, second and third paths.

2. The method of claim 1 in which said stacks are introduced into buckets while traveling in said third path and said second gripping means is deactuated thereafter.

3. The method of claim 1 in which alternate of said series of stacks are translated into said third path, the remaining stacks being continuously gripped by said first gripping means throughout travel of said first gripping means in said second path, directing said first gripping means through an arcuate quadrant and into a fourth lineal path parallel to and in a direction opposite from said first lineal path, actuating third gripping means also being advanced in said fourth path and translating said stacks to a fifth lineal path parallel to said fourth path and thereafter deactuating said first gripping means.

4. The method of claim 1 in which said stacks are initially comprised of superposed continuous webs which are advanced along said first path and, after being gripped at longitudinally spaced apart locations by said first gripping means, are transversely severed into said stacks while in said first path.

5. A method of handling stacks of superposed web units incident to cartoning comprising advancing a plurality of superposed continuous webs in a first lineal path, gripping said webs at longitudinally spaced apart points with first gripping means and transversely severing said webs between the locations of gripping to provide stacks elongated in the direction of said first path, advancing said first gripping means and said stacks around an arcuate quadrant into a second lineal path perpendicular to said first path and while maintaining the long dimension of said stacks parallel to said first path, and thereafter removing said stacks from said second path by second gripping means for introduction in cartons, each stack being laterally translated by said second gripping means from said second path to a third lineal path parallel to said second path and while said stacks are continuously gripped.

6. Apparatus for handling stacks of web units incident to cartoning comprising a frame, an endless conveyor on said frame traveling in a first lineal path, and thereafter through an arcuate quadrant to a second lineal path perpendicular to said first lineal path, said conveyor being equipped with a plurality of longitudinally spaced grippers for said stacks, and control means on said frame for controlling said grippers to maintain the attitude of said grippers the same in at least a portion of second path as it was in said first path, a second conveyor being mounted on said frame for travel in said second path, said second conveyor being equipped with grippers for engaging stacks already gripped by the first-mentioned conveyor grippers, and means on said frame for opening said first-mentioned grippers after said stacks have been gripped by said second conveyor grippers, and means operably associated with said second conveyor grippers for laterally translating said second conveyor grippers with said stacks into a third path parallel to said second path.

7. The apparatus of claim 6 in which said first-mentioned grippers are pivotally mounted on said first conveyor, said control means including cam means for pivoting said grippers as they move through said arcuate quadrant.

8. The apparatus of claim 7 in which said frame is equipped with second camming means for maintaining said first-mentioned grippers open during initial travel thereof in said first path.

9. The apparatus of claim 8 in which means are operably associated with said frame for introducing a plurality of superposed webs into said first path for sequential gripping engagement by said first-mentioned grippers, and saw means on said frame for transversely severing said superposed webs between said first-mentioned grippers to provide a series of gripped stacks in said first path.

10. The apparatus of claim 6 in which said first mentioned conveyor grippers include spaced apart plates pivotally mounted relative to said first mentioned conveyor, said plates being notched to expose a stack edge portion for engagement by said second conveyor grippers.

11. The apparatus of claim 6 in which a bucket conveyor is mounted on said frame for movement in said third path and for sequentially receiving stacks as the same are translated by said second conveyor grippers, and means on said frame for opening said second conveyor grippers to release stacks into the control of said bucket conveyor.

12. A method of handling articles such as stacks of web units and the like comprising advancing a plurality of superposed continuous web units in a first lineal path, gripping said webs at longitudinally spaced apart points with first gripping means, traveling a saw along said first path to sever said webs transversely between successive gripping points while said webs are being continuously advanced whereby a series of stacks are thereafter advanced along the remainder of said first path and while being gripped in a given attitude relative to said first path, advancing said first gripping means and said stacks around a 90° quadrant while continuing to grip the same and also while maintaining said stacks in the said given attitude relative to said first path, thereafter advancing said stacks in a second path perpendicular to said first path, additionally gripping an edge portion of each stack with second gripping means while the same is traveling in gripped condition in said second path, thereafter releasing the intitial gripping of said first gripping means on said stacks and laterally translating said second gripping means with said stacks sequentially into a third path parallel to said second path.

13. Apparatus for handling stacks of web units comprising a frame, an endless conveyor on said frame traveling in a first horizontal path and thereafter through an arcuate quadrant into a second horizontal path perpendicular to said first lineal path, said conveyor being equipped with a plurality of longitudinally spaced grippers for said stacks to grip the same in a given attitude relative to said first path, means on said frame operably associated with said grippers for maintaining said stacks in said given attitude relative to said first path when the same are traveling in said second path, a second endless conveyor on said frame having a horizontal run extending in side-by-side relation to said second path, said second conveyor having gripping means extendable horizontally therefrom into said second path to controllably remove stacks from said second path at high speed without stack disruption due to windage.

* * * * *